United States Patent [19]

Silvestri, Jr.

[11] Patent Number: 4,819,435
[45] Date of Patent: Apr. 11, 1989

[54] METHOD FOR REDUCING VALVE LOOPS FOR IMPROVING STREAM TURBINE EFFICIENCY

[75] Inventor: George J. Silvestri, Jr., Winter Park, Fla.

[73] Assignee: Westinghouse Electric Corp., Pittsburgh, Pa.

[21] Appl. No.: 217,515

[22] Filed: Jul. 11, 1988

[51] Int. Cl.$^4$ .............................................. F01K 13/02
[52] U.S. Cl. ........................................ 60/646; 60/657
[58] Field of Search .......................... 60/646, 657, 660

[56] References Cited

U.S. PATENT DOCUMENTS

| 4,178,762 | 12/1979 | Binstock et al. | 60/667 |
| 4,280,060 | 7/1981 | Kure-Jensen et al. | 60/646 |
| 4,297,848 | 11/1981 | Silvestri et al. | 60/600 |

OTHER PUBLICATIONS

G. W. Bouton, et al.; "Ten Years Experience with Large Pulverized Coal-Fired Boilers for Utility Service"; Apr. 26-28, pp. 19-21.
L. G. Crispin, et al.; "Jacksonville Electric Authority's Conversion of a Subcritical Once-Through Unit to Variable Pressure Cycling Duty"; pp. 1-7.

Primary Examiner—Allen M. Ostrager

[57] ABSTRACT

A steam turbine power generation generation system includes a partial-arc steam turbine connected in driving relationship to an electric power generator and a boiler system for supplying steam at a predetermined pressure and temperature to the turbine. The boiler system includes a primary superheater, a serially connected division valve for controlling steam flow and pressure and a finish superheater. The turbine system includes a plurality of control valves for controlling steam admission to each partial-arc and a microcomputer base control means for controlling operation of the control valves and the division valve in response to load demands on the system so as to maintain constant speed operation of the steam turbine. The control means provides control signals to the division valve and the control valves for synchronizing operation of the division valve with sequential closing of each of the control valves with the division valve being operated to reduce steam pressure for effecting a reduction in steam flow in accordance with an optimum heat rate for an existing arc of steam admission. Each control valve is operated to modify the arc of admission with constant steam pressure when such modification provides a better heat rate than sliding pressure using the division valve.

4 Claims, 3 Drawing Sheets

METHOD FOR REDUCING VALVE LOOPS FOR IMPROVING STREAM TURBINE EFFICIENCY

This invention relates to steam turbines and, more particularly, to a method and apparatus for improving the efficiency of a partial-arc admission steam turbine.

BACKGROUND OF THE INVENTION

The power output of many multi-stage steam turbine systems is controlled by throttling the main flow of steam from a steam generator in order to reduce the pressure of steam at the high pressure turbine inlet. Steam turbines which utilize this throttling method are often referred to as full arc turbines because all steam inlet nozzle chambers are active at all load conditions. Full arc turbines are usually designed to accept exact steam conditions at a rated load in order to maximize efficiency. By admitting steam through all of the inlet nozzles, the pressure ratio across the inlet stage, e.g., the first control stage, in a full arc turbine remains essentially constant irrespective of the steam inlet pressure. As a result, the mechanical efficiency of power generation across the control stage may be optimized. However, as power is decreased in a full arc turbine, there is an overall decline in efficiency, i.e., the ideal efficiency of the steam work cycle between the steam generator and the turbine output, because throttling reduces the energy available for performing work. Generally, the overall turbine efficiency, i.e., the actual efficiency is a product of the ideal and the mechanical efficiency of the turbine.

More efficient control of turbine output than is achievable by the throttling method has been realized by the technique of dividing steam which enters the turbine inlet into isolated and individually controllable arcs of admission. In this method, known as partial-arc admission, the number of active first stage nozzles is varied in response to load changes. Partial arc admission turbines have been favored over full arc turbines because a relatively high ideal efficiency is attainable by sequentially admitting steam through individual nozzle chambers with a minimum of throttling, rather than by throttling the entire arc of admission. The benefits of this higher ideal efficiency are generally more advantageous than the optimum mechanical efficiency achievable across the control stage of full arc turbine designs. Overall, multi-stage steam turbine systems which use partial-arc admission to vary power output operate with a higher actual efficiency than systems which throttle steam across a full arc of admission. However, partial-arc admission systems in the past have been known to have certain disadvantages which limit the efficiency of work output across the control stage. Some of these limitations are due to unavoidable mechanical constraints, such as, for example, an unavoidable amount of windage and turbulence which occurs as rotating blades pass nozzle blade groups which are not admitting steam.

Furthermore, in partial-arc admission systems the pressure drop (and therefore the pressure ratio) across the nozzle blade groups varies as steam is sequentially admitted through a greater number of valve chambers, the largest pressure drop occurring at the minimum valve point (fewest possible number of governor or control valves open) and the smallest pressure drop occurring at full admission. The thermodynamic efficiency, which is inversely proportional to the pressure differential across the control stage, is lowest at the minimum valve point and highest at full admission. Thus, the control stage efficiency for partial-arc turbines as well as full arc turbines decreases when power output drops below the rated load. However, given the variable pressure drops across the nozzles of a partial-arc turbine, it is believed that certain design features commonly found in partial-arc admission systems can be improved upon in order to increase the overall efficiency of a turbine. Because the control stage is an impulse stage wherein most of the pressure drop occurs across the stationary nozzles, a one percent improvement in nozzle efficiency will have four times the effect on control stage efficiency as a one percent improvement in the efficiency of the rotating blades. Turbine designs which provide even modest improvements in the performance of the control stage nozzles will significantly improve the actual efficiency of partial-arc turbines. At their rated loads, even a 0.25 percent increase in the actual efficiency of a partial-arc turbine can result in very large energy savings.

Sliding or variable throttle pressure operation of partial-arc turbines also results in improved turbine efficiency and additionally reduces low cycle fatigue. The usual procedure is to initiate sliding pressure operation on a partial-arc admission turbine at flows below the value corresponding to the point where half the control valves are wide open and half are fully closed, i.e., 50% first stage admission on a turbine in which the maximum admission is practically 100%. If sliding pressure is initiated at a higher flow (larger value of first stage admission), there is a loss in performance. However, in a turbine having eight valves, sliding from 75% admission eliminates a considerable portion of the valve loop (valve throttling) on the sixth valve which would occur with constant throttle pressure operation. A similar situation occurs when sliding from 62.5% admission: a considerable portion of the valve loop of the fifth valve is eliminated. Elimination of such valve loops improves the turbine heat rate and its efficiency.

FIG. 1 illustrates the effect of sliding pressure control in a partial-arc steam turbine having eight control valves. The abscissa represents values of steam flow while the ordinate values are heat rate. Line 10 represents constant pressure with throttling control while line 12 represents sliding pressure on a full arc admission turbine. Line 14 represents constant pressure with sequential valve control (partial-arc admission) and dotted lines 16, 18, 20 and 22 represent the valve loops. The valve loops result from gradual throttling of each of a sequence of control or governor valves. Sliding pressure operation from 75% admission is indicated by line 24. Note that much of the valve loop 20 is eliminated by sliding pressure along line 24 but that heat rate (the reciprocal of efficiency) increases disproportionately below the 62.5% admission point. Line 26, showing sliding pressure from the 62.5% admission point, provides some improvement but does not affect valve loops 16, 18 and 20. Similarly, sliding from 50% admission, line 28, helps at the low end but does not affect valve loops 16-22. Each of these valve loops represent higher heat rates and reduced efficiency from the ideal curve represented by line 14.

FIGS. 2, 3 and 4 illustrate the operation of an exemplary steam turbine using one prior art control. FIG. 2 shows the locus of full valve points, line 30, with constant pressure operation at 2535 psia. The valve points are at 50%, 75%, 87.5% and 100% admission with the valve loops identified by the lines 32, 34 and 36. Sliding pressure is indicated by lines 38, 40 and 42. Starting at 100% admission, about 806 MW for the exemplary turbine system, load is initially reduced by keeping all eight control valves wide open and sliding throttle pressure by controlling the steam producing boiler. When the throttle pressure, line 38, reaches the intersection point with the valve loop 32, the throttle pressure is increased to 2535 psia while closing the eighth control valve. The control valve would continue to close as load is further reduced while maintaining the 2535 psia throttle pressure until this valve is completely closed at which point the turbine is operating at 87.5% admission. To further reduce load, valve position is again held constant, seven valves fully open, and throttle pressure is again reduced until the throttle pressure corresponds to the intersection of the sliding pressure line 40 and the valve loop 34 for the seventh valve. To reduce load below this point, the pressure is increased to 2535 psia and the seventh valve is progressively closed (riding down the valve loop) until it is completely closed. The admission is now 75%. To reduce load still further, the pressure is again reduced with six valves wide open and two fully closed until the throttle pressure line 42 reaches the intersection with the valve loop 36 where the fifth and sixth valves move simultaneously with constant throttle pressure operation. Then the operation of raising throttle pressure and closing of the valves is repeated for any number of valves desired. The variation in throttle pressure is illustrated in FIG. 3. The sloped portions 44 of line 46 relates to the sliding pressure regime with constant valve position. The vertical portions 48 relate to the termination of sliding pressure with no valve throttling and the uppermost point relates to operation at full pressure with valve throttling. The horizontal portions 50 relate to the riding down of the valve loop while reducing load at constant pressure. FIG. 4 shows the improvement in heat rate as a function of load. The line 52 illustrates the difference between valve loop performance at constant pressure and the performance with variable pressure between valve points.

The performance improvements shown in FIGS. 2 and 4 are based on the assumption that the boiler feed pump discharge is reduced as the throttle pressure is reduced. If it is not reduced proportionally, the improvement is reduced since the energy required to maintain discharge pressure remains high. In the prior art system, a signal is sent to the feed pump-feed pump drive system to reduce pressure. In reality, however, the feed pump is followed by a pressure regulator in order to eliminate the need for constant adjustment of pump speed and the occurrence of control instability and hunting because of small variations in inlet water pressure to the boiler, resulting from perturbations in flow demand. The regulator, then, does more or less throttling which changes pump discharge pressure and therefore the flow that the pump will deliver. The pump speed is held constant over a desired range of travel of the regulator valve. When the valve travel gets outside these limits, the pump speed is adjusted to move the valve to some desired mean position. As a consequence, the pump discharge pressure does not equal the minimum allowable value (throttle pressure plus system head losses) and so the performance improvement is not as large as shown by FIGS. 2 and 4. In addition, in order to achieve quicker load response, the regulator valve is usually operated with some pressure drop so that if there is a sudden increase in load demand, the valve can open quickly and increase flow. The response of the pump and its drive is slower than the response of the regulator valve.

SUMMARY OF THE INVENTION

Among the several objects and advantages of the present invention may be noted the provision of a method for operation of a partial-arc steam turbine which overcomes many of the disadvantages noted above and the provision of a method with faster load response and heat rate benefits on turbine systems which cannot be operated with variable pressure or where it is undesirable to operate with variable pressure in portions of the boiler systems.

The method of the present invention is described in a system in which a combination of sliding pressure and valve throttling is utilized to achieve better efficiency. In particular, it is described in conjunction with a steam turbine system in which there is provided a boiler and primary superheater operating at essentially constant pressure. A division valve couples the primary superheater to a finishing superheater. A control system is coupled to the division value for throttling the division valve so that the finishing superheater and turbine can operate with sliding pressure while maintaining constant pressure operation of the boiler and primary superheater. The system is operated by varying the division valve to reduce the size of valve loops until the variable pressure intersects the computed valve loop value. Pressure is then increased to its normal operating value and the associated partial-arc control valve closed. Thereafter, the division valve is then operated until another intersection of the variable pressure with a computed valve loop pressure at which point pressure is again increased and the associated control valve throttled to closing.

While the prior art procedure reduces pump discharge (in reality regulator discharge) pressure, in order to reduce throttle pressure, the present system throttles on the division valves with sliding throttle pressure. The load response will be superior since the boiler pressure is not reduced. In addition, the present invention can be used on both subcritical and supercritical pressure boilers that cannot operate reliably or may be subjected to undesirable temperature changes if operated in a true sliding pressure mode. In particular, in one form, the invention comprises a steam turbine power generation system including a partial-arc steam turbine connected in driving relationship to an electric power generator. Boiler means is provided for supplying steam at a predetermined pressure and temperature, the boiler means including a primary superheater, a serially connected division valve for controlling steam m pressure and a finishing superheater. The system further includes a plurality of control valves for controlling steam admission to each partial-arc of the turbine and a microcomputer based control means for controlling operation of the control valves and the division valve in response to load demands on the system so as to maintain the desired steam supply pressure to the steam turbine. The control means provides control signals to the division valve and the control valves for synchronizing operation of the division valve with sequential closing of each of the control valves. The division valve is operated to reduce steam pressure for effecting a reduction in steam flow in accordance with an optimum heat rate for an existing arc of steam admission. Each control valve is operated to modify the arc of admission with constant steam pressure (such modification provides a better heat rate than sliding pressure operation under control of the division valve). In this illustrative system, the inventive method reduces valve loops in the partial-arc steam turbine by computing in the microprocessor based control means or controller the amount of steam flow required to establish a power output of the turbine commensurate with the load demand. The control means determines a first intersection point of a first reduced steam flow valve loop formed by gradual closing of a one of the governor or control valves with a corresponding reduced steam flow caused by gradual closing of the division valve. The division valve is gradually closed to reduce steam pressure at the throttle valve until the first intersection point is reached as indicated by monitor steam flow. The division valve is fully opened to return steam pressure to its normal value while simultaneously closing the one of the control valves so that steam flow is maintained at the value of the first intersection point. The next one of the control valves is then gradually closed in correspondence with the first valve loop until it is fully closed. The control means senses closure of the one of the control valves and determines a second intersection point of a second reduced steam flow valve loop formed by closing of another of the control valves with a corresponding reduced steam flow caused by closing of the division valve. The division valve is gradually closed to reduce steam pressure at the throttle valve until the second intersection point is reached and thereafter the division valve is fully opened to return steam pressure to its normal value while simultaneously closing the another of the control valves so that steam flow is maintained at the value of the second intersection point. The another of the control valves is then gradually closed and the steps of closing and opening of the division valve and sequentially closing the control valves for each of a plurality of valve loops is repeated until the minimum arc of admission is achieved. The finishing superheater is controlled to maintain steam temperature at reduced pressure.

BRIEF DESCRIPTION OF THE DRAWINGS

For a better understanding of the present invention, reference may be had to the following detailed description taken in conjunction with the accompanying drawing in which.

DETAILED DESCRIPTION OF THE PREFERRED EMBODIMENT

Figure 5:
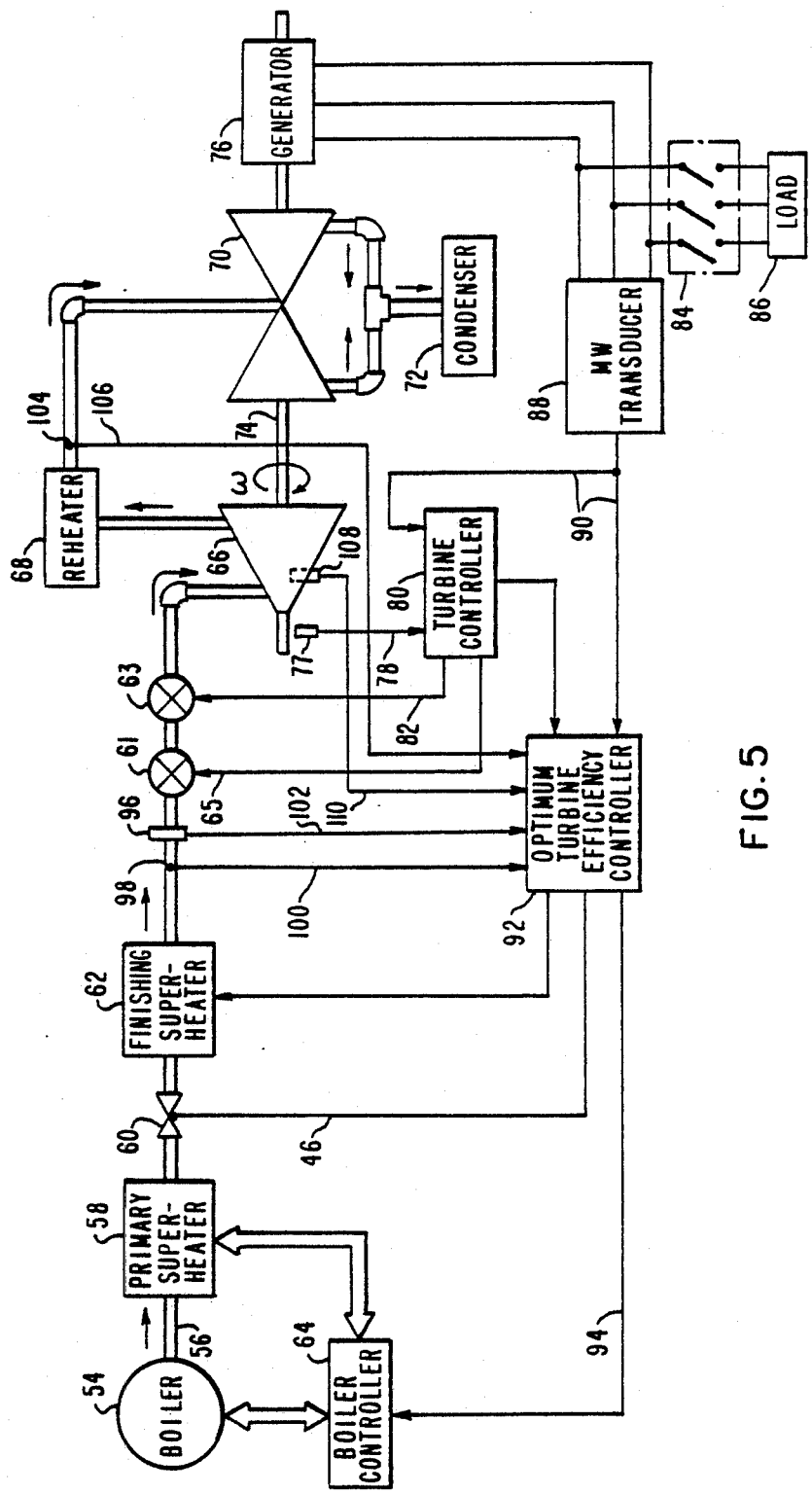
FIG. 5 is an illustration of one form of system for implementing the method of the present invention.

In FIG. 5 is depicted a functional block diagram schematic of a typical steam turbine power plant suitable for embodying the principles of the present invention. In the plant of FIG. 5, a conventional boiler 54 which may be of a nuclear fuel or fossil fuel variety produces steam which is conducted through a header 56, primary superheater 58, a division valve 60, a finishing superheater 62 and throttle valve 61 to a set of partial-arc steam admission control valves depicted at 63. Associated with the boiler 54, is a conventional boiler controller 64 which is used to control various boiler parameters such as the steam pressure at the header 56. More specifically, the steam pressure at the header 56 is usually controlled by a set point controller (not shown) disposed within the boiler controller 64. Such a set point controller arrangement is well known to all those skilled in the pertinent art and therefore, requires no detailed description for the present embodiment. Steam is regulated through a high pressure section 66 of the steam turbine in accordance with the positioning of the steam admission valves 63. Normally, steam exiting the high pressure turbine section 66 is reheated in a conventional reheater section 68 prior to being supplied to at least one lower pressure turbine section shown at 70. Steam exiting the turbine section 70 is conducted into a conventional condenser unit 72.

In most cases, a common shaft 74 mechanically couples the steam turbine sections 66 and 70 to an electrical generator unit 76. As steam expands through the turbine sections 66 and 70, it imparts most of its energy into torque for rotating the shaft 74. During plant startup, the steam conducted through the turbine sections 66 and 70 is regulated to bring the rotating speed of the turbine shaft to the synchronous speed of the line voltage or a subharmonic thereof. Typically, this is accomplished by detecting the speed of the turbine shaft 74 by a conventional speed pickup transducer 77. A signal 78 generated by transducer 77 is representative of the rotating shaft speed and is supplied to a conventional turbine controller 80. The controller 80 in turn governs the positioning of the steam admission valves using signal lines 82 for regulating the steam conducted through the turbine sections 66 and 70 in accordance with a desired speed demand and the measured speed signal 78 supplied to the turbine controller 80. The throttle valve 61 may be controlled at turbine start-up thus allowing the control valves 63 to be fully open until the turbine is initially operating at about five percent load. The system then transitions to partial-arc operation and the throttle valve 61 fully opened. However, the throttle valve 61 is generally an emergency valve used for emergency shut-down of the turbine. The line 65 from controller 80 provides control signals to valve 61.

A typical main breaker unit 84 is disposed between the electrical generator 76 and an electrical load 86 which for the purposes of the present description may be considered a bulk electrical transmission and distribution network. When the turbine controller 80 determines that a synchronization condition exists, the main breaker 84 may be closed to provide electrical energy to the electrical load 86. The actual power output of the plant may be measured by a conventional power measuring transducer 88, like a watt transducer, for example, which is coupled to the electrical power output lines supplying electrical energy to the load 86. A signal which is representative of the actual power output of the power plant is provided to the turbine controller 80 over signal line 90. Once synchronization has taken place, the controller 80 may conventionally regulate the steam admission valves 63 to provide steam to the turbine sections 66 and 70 commensurate with the desired electrical power generation of the power plant.

In accordance with the present invention, an optimum turbine efficiency controller 92 is disposed as part of the steam turbine power plant. The controller 92 monitors thermodynamic conditions of the plant at a desired power plant output by measuring various turbine para meters as will be more specifically described herebelow and with the benefit of this information governs the adjustment of the boiler steam pressure utilizing the signal line 94 coupled from the controller 92 to the boiler controller 64. In the present embodiment, the boiler pressure adjustment may be accomplished by altering the set point of a set point controller (not shown) which is generally known to be a part of the boiler controller 64. As may be the case in most set point controllers, the feedback measured parameter, like steam pressure, for example, is rendered substantially close to the set point, the deviation usually being a function of the output/input gain characteristics of the pressure set point controller. More importantly to the present invention, the controller 92 controls the positioning of division valve 60 utilizing signal line 94. The valve 60 may be a conventional electromechanical steam control valve. By controlling valve 60, controller 92 is able to regulate throttle steam pressure, i.e., the pressure of steam at control valves 63. Control of valve 60 avoids the need to use throttle valve 61 for regulation at start-up and thus simplifies its control to either open or closed. Division valve 60 provides for better transition from full-arc start-up to partial-arc operation with a more benign environment for turbine 66.

Turbine parameters like throttle steam pressure and temperature are measured respectively by conventional pressure transducer 96 and temperature transducer 98. Signals 100 and 102 generated respectively by the transducers 96 and 98 may be provided to the optimum turbine efficiency controller 92. Another parameter, the turbine reheat steam temperature at the reheater 68 is measured by a conventional temperature transducer 104 which generates a signal 106 may also be provided to the controller 92 for use thereby. The signal on line 90 which is generated by the power measuring transducer may be additionally provided to the controller 92. Moreover, an important turbine parameter is one which reflects the steam flow through the turbine sections 66 and 70. For the purposes of the present embodiment, the steam pressure at the impulse chamber of the high pressure turbine section 68 is suitably chosen for that purpose. A conventional pressure transducer 108 is disposed at the impulse chamber section for generating and supplying a signal 110, which is representative of the steam pressure at the impulse chamber, to the controller 92.

One embodiment of the turbine efficiency controller 92 sufficient for describing the operation of the controller 92 in more specific detail is shown in U.S. Pat. No. 4,297,848 assigned to the assignee of the present invention, the disclosure of which is hereby incorporated by reference.

Figure 1:
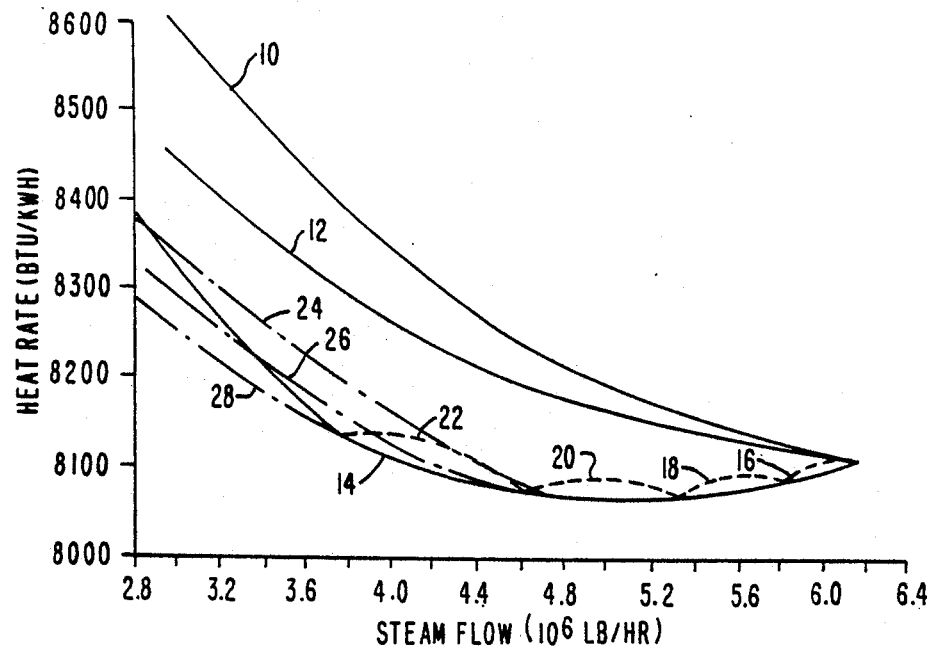
FIG. 1 is a sequence of steam flow versus heat rate curves characteristic of one prior art method of steam turbine control.
Figure 2:
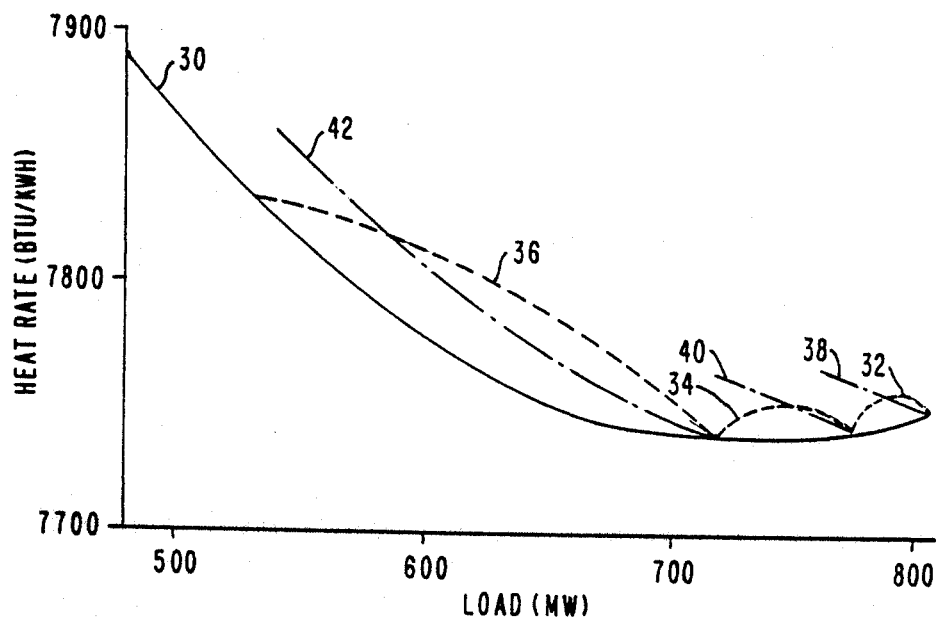
FIG. 2 is a curve characteristic of another prior art method of control of a steam turbine.
Figure 3:
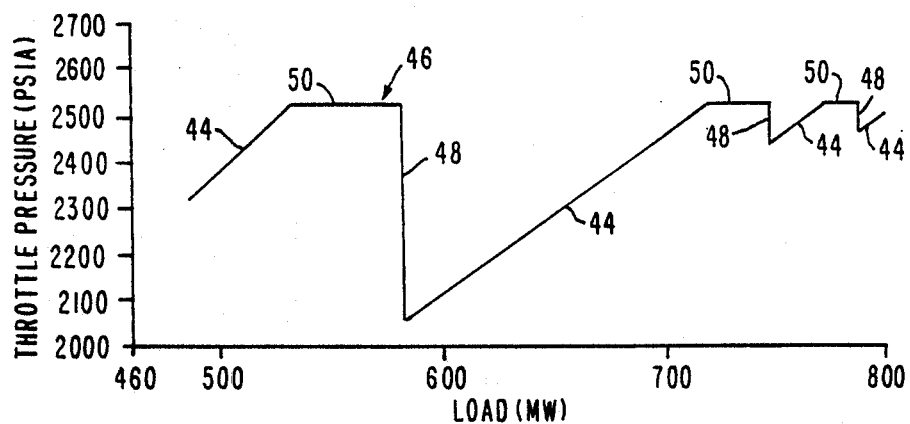
FIG. 3 illustrates throttle pressure as a function of load for the method of FIG. 2.
Figure 4:
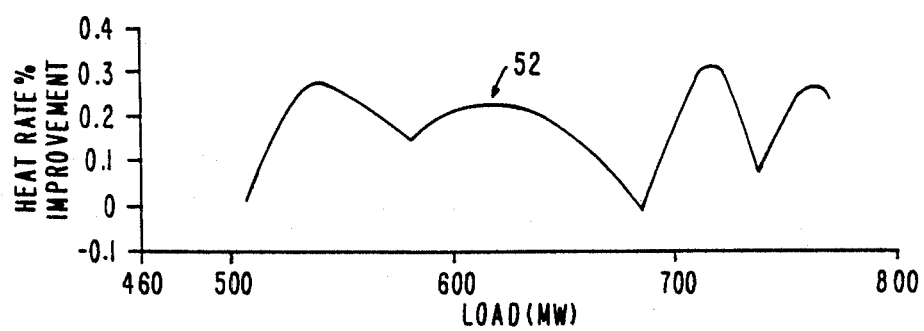
FIG. 4 illustrates calculated efficiency improvement for the method of FIG. 2.

As described in the aforementioned U.S. Pat. No. 4,297,848, the controller 92 and the controller 80 may include microcomputer based systems for computing appropriate set points, e.g., throttle pressure and steam flow, for optimum operation of the steam turbine system in response to load demands. In the present invention, it is desirable to control throttle steam pressure applied to valves 63 in order to optimize system efficiency while having the ability to rapidly respond to increased load demand. The system of FIG. 5 achieves this result by controlling the division valve 60 end the finishing superheater 62 in a manner to regulate throttle steam pressure without changing boiler pressure upstream of the division valve 60 as has been done in prior art systems. The method of operation in response to reduced load demands is to compute the intersection points at which steam flow at constant pressure through control valves 63 equals steam flow achieved by reduced pressure. Since these values are readily computed from turbine pressure and flow rates, they may be obtained in advance and stored in appropriate look-up table memory in the microcomputer controller 92. Points are computed for each of a plurality of the valve loops defined by sequential gradual closing of the valves 63 in the manner described with regard to FIG. 2. The division valve 60 is then gradually closed to begin reducing flow until the first intersection point is reached. Valve 60 is then fully opened so that pressure can jump rapidly back to its normal operating value and the first of the control valves 63 is closed to the degree that steam flow is held at the intersection point value. The control valve is then gradually closed at a controlled rate until fully closed. Pressure is then again reduced by use of division valve 60 until a second intersection point with a valve loop is reached and the above steps are again repeated. By this repetitive cycling of the division valve 60 in conjunction with step-wise closing of the control valves 63, optimum efficiency can be attained without reducing boiler pressure upstream of division valve 60. Accordingly, the system performs more in form with the desirable characteristics of FIG. 3 and does not require extended time to recover to normal operating pressures.

What is claimed:

1. A method of reducing valve loops in a partial-arc steam turbine having a plurality of control valves for controlling steam flow into the turbine, the steam being supplied from a boiler through a division valve and a secondary superheater, the turbine being controlled in response to load demands by a microcomputer based controller coupled to at least the division valve and the control valves, the method comprising the steps of:

computing in the controller the amount of steam flow required to establish a power output of the turbine commensurate with the load demand;

determining a first intersection point of a first reduced steam flow valve loop formed by gradual closing of a one of the control valves with a corresponding reduced steam flow caused by gradual closing of the division valve;

gradually closing the division valve to reduce steam pressure at the control valves until the first intersection point is reached as indicated by monitored steam flow;

fully opening the division valve to return steam pressure to its normal value while simultaneously closing the one of the control valves so that steam flow is maintained at the value of the first intersection point;

gradually closing the one of the control valves in correspondence with the first valve loop until it is fully closed;

sensing closure of the one of the control valves;

determining a second intersection point of a second reduced steam flow valve loop formed by closing of another of the control valves with a corresponding reduced steam flow caused by closing of the division valve;

gradually closing the division valve to reduce steam pressure at the control valves until the second intersection point is reached;

fully opening the division valve to return steam pressure to its normal value while simultaneously closing the another of the control valves so that steam flow is maintained at the value of the second intersection point;

gradually closing the another of the control valves until it is fully closed; and repeating the steps of closing and opening of the division valve and sequentially closing the control valves for each of a plurality of valve loops.

2. The method of claim 1 and including the step of controlling the finishing superheater to maintain steam temperature at reduced pressure.

3. The method of claim 2 and including the steps of fully opening the control valves at turbine start-up and regulating steam pressure by controlling the division valve.

4. A steam turbine power generation system including a partial-arc steam turbine connected in driving relationship to an electric power generator, boiler means for supplying steam at a predetermined pressure and temperature, the boiler means including a primary superheater, a serially connected division valve for controlling steam flow and pressure and a finish superheater, the system further including a plurality of control valves for controlling steam admission to each partial-arc and microcomputer based control means for controlling operation of the control valves and the division valve in response to load demands on the system so as to maintain constant speed operation of the steam turbine, the control means providing control signals to the division valve and the control valves for synchronizing operation of the division valve with sequential closing of each of the control valves, the division valve being operated to reduce steam pressure for effecting a reduction in steam flow in accordance with an optimum heat rate for an existing arc of steam admission and each control valve being operated to modify the arc of admission with constant steam pressure when such modification provides a better heat rate than sliding pressure.

* * * * *